(12) United States Patent
Yabe et al.

(10) Patent No.: US 10,931,155 B2
(45) Date of Patent: Feb. 23, 2021

(54) ROTOR, ELECTRIC MOTOR, COMPRESSOR, AIR CONDITIONER, AND METHOD FOR MANUFACTURING ELECTRIC MOTOR

(71) Applicant: Mitsubishi Electric Corporation, Tokyo (JP)

(72) Inventors: Koji Yabe, Tokyo (JP); Yoshikazu Fujisue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 100 days.

(21) Appl. No.: 16/083,556

(22) PCT Filed: May 25, 2016

(86) PCT No.: PCT/JP2016/065404
§ 371 (c)(1),
(2) Date: Sep. 10, 2018

(87) PCT Pub. No.: WO2017/203618
PCT Pub. Date: Nov. 30, 2017

(65) Prior Publication Data
US 2019/0074738 A1 Mar. 7, 2019

(51) Int. Cl.
*H02K 1/27* (2006.01)
*F24F 1/10* (2011.01)
(Continued)

(52) U.S. Cl.
CPC ............ *H02K 1/2766* (2013.01); *F24F 1/10* (2013.01); *F24F 1/22* (2013.01); *H02K 1/16* (2013.01);
(Continued)

(58) Field of Classification Search
CPC ...... H02K 1/276; H02K 1/2766; H02K 21/12; H02K 21/14; H02K 2213/03
(Continued)

(56) References Cited

U.S. PATENT DOCUMENTS

2004/0046472 A1\* 3/2004 Noda .................. H02K 1/04
310/156.78
2007/0126304 A1 6/2007 Ito et al.
(Continued)

FOREIGN PATENT DOCUMENTS

CN 104184296 A 12/2014
DE 1488733 A1 \* 6/1969 ........... H02K 1/2726
(Continued)

OTHER PUBLICATIONS

JP 2010206882 A (English Translation) (Year: 2010).\*
(Continued)

*Primary Examiner* — Quyen P Leung
*Assistant Examiner* — Alexander Moraza
(74) *Attorney, Agent, or Firm* — Posz Law Group, PLC

(57) ABSTRACT

A rotor includes a first permanent magnet, a second permanent magnet, and an electromagnetic steel sheet. The electromagnetic steel sheet includes a magnet insertion hole, a projection, a first end part, a second end part (211*b*), a third end part, and a fourth end part. The rotor satisfies an expression of t≤2×w×sin(R/2)≤2×t, where t is a thickness of the electromagnetic steel sheet, R is an angle formed by the third end part and the fourth end part, and w is a distance from an intersection point of a straight line including the first end part and a straight line including the third end part to an intersection point of a straight line including the third end part and a straight line including the fourth end part.

17 Claims, 10 Drawing Sheets

(51) Int. Cl.
*F24F 1/22* (2011.01)
*H02K 1/16* (2006.01)
*H02K 1/28* (2006.01)
*H02K 15/03* (2006.01)
*H02K 15/12* (2006.01)

(52) U.S. Cl.
CPC ............... *H02K 1/28* (2013.01); *H02K 15/03* (2013.01); *H02K 15/12* (2013.01); *H02K 2213/03* (2013.01)

(58) Field of Classification Search
USPC ........................................ 310/156.53, 156.56
See application file for complete search history.

(56) References Cited

U.S. PATENT DOCUMENTS

| | | | | |
|---|---|---|---|---|
| 2014/0145538 A1* | 5/2014 | Date | ................... | H02K 1/2766 310/156.53 |
| 2015/0137646 A1* | 5/2015 | Tsuchida | .................. | H02K 1/28 310/156.09 |
| 2016/0087494 A1* | 3/2016 | Fischer | ................ | H02K 1/2766 310/156.43 |
| 2016/0285330 A1* | 9/2016 | Mukai | ................. | F04C 29/0085 |

FOREIGN PATENT DOCUMENTS

| | | | | | |
|---|---|---|---|---|---|
| JP | 2005-086955 | A | | 3/2005 | |
| JP | 2007-159196 | A | | 6/2007 | |
| JP | 2007-181254 | A | | 7/2007 | |
| JP | 2007-336671 | A | | 12/2007 | |
| JP | 2010206882 | A | * | 9/2010 | |
| JP | 2012-050331 | A | | 3/2012 | |
| JP | 2012050331 | A | * | 3/2012 | ............ H02K 1/276 |
| JP | 2015006124 | A | * | 1/2015 | |

OTHER PUBLICATIONS

JP 2015006124 A (English Translation) (Year: 2015).*
JP 2012050331 A (English Translation) (Year: 2012).*
DE 1488733 A1 (English Translation) (Year: 1969).*
International Search Report ("ISR") dated Aug. 16, 2016 issued in corresponding international patent application No. PCT/JP2016/065404.
Office Action dated Dec. 2, 2019 corresponding CN Application No. 201680085456.X ( with English translation attached).

* cited by examiner

ROTOR, ELECTRIC MOTOR, COMPRESSOR, AIR CONDITIONER, AND METHOD FOR MANUFACTURING ELECTRIC MOTOR

CROSS REFERENCE TO RELATED APPLICATION

This application is a U.S. national stage application of International Application No. PCT/JP2016/065404, filed on May 25, 2016, the contents of which are incorporated herein by reference.

TECHNICAL FIELD

The present invention relates to a rotor including permanent magnets.

BACKGROUND

In an electric motor, when a large amount of magnetic flux are generated from a stator (magnetic flux toward a rotor), the amount of magnetic flux from permanent magnets disposed in the rotor decreases. This phenomenon is generally called demagnetization (hereinafter referred to as "degradation of demagnetization characteristic of permanent magnets"). When the amount of the magnetic flux from the permanent magnets decreases due to the demagnetization, the efficiency of the electric motor decreases. In view of this, in order to suppress the demagnetization, proposed is a rotor configured in consideration of a position through which magnetic flux from a stator pass. For example, in a rotor of a permanent magnet type brushless DC electric motor described in Patent Reference 1, a gap is formed between adjacent permanent magnets so that leakage of the magnetic flux from the permanent magnets is reduced, and thus a decrease in efficiency of the electric motor is suppressed.

PATENT LITERATURE

Patent Reference 1: Japanese Patent Application Publication No. 2007-181254 (see FIG. 10)

To form the gap between the adjacent permanent magnets, however, in the rotor described in Patent Reference 1, a permanent magnet fixing projection for positioning the permanent magnets is formed. Thus, a magnetic flux from a stator tend to pass through the permanent magnet fixing projection. When a large amount of magnetic flux flows into the permanent magnet fixing projection, demagnetization easily occurs in a portion of the permanent magnet adjacent to the permanent magnet fixing projection. Consequently, efficiency of the electric motor decreases in some cases.

It is therefore an object of the present invention to suppress demagnetization of permanent magnets provided in a rotor.

A rotor according to the present invention includes: a first permanent magnet; a second permanent magnet; and an electromagnetic steel sheet including a magnet insertion hole and a projection formed between the first permanent magnet and the second permanent magnet, the first permanent magnet and the second permanent magnet being disposed in the magnet insertion hole, wherein the electromagnetic steel sheet includes: a first end part defining the magnet insertion hole; a second end part defining the magnet insertion hole; a third end part forming the projection; and a fourth end part forming the projection, and the rotor satisfies an expression of $t \leq 2 \times w \times \sin(R/2) \leq 2 \times t$, where $t$ is a thickness of the electromagnetic steel sheet, $R$ is an angle formed by the third end part and the fourth end part, and $w$ is a distance from an intersection point of a straight line including the first end part and a straight line including the third end part to an intersection point of a straight line including the third end part and a straight line including the fourth end part.

According to the present invention, demagnetization of permanent magnets provided in a rotor can be suppressed.

DETAILED DESCRIPTION

An electric motor 1 according to a first embodiment of the present invention will be described.

In an xyz orthogonal coordinate system in each drawing, a z-axis direction (z axis) refers to a direction parallel to an axis line A1 (axial center) of a shaft 23 of the electric motor 1 (hereinafter referred to as an "axial direction"), an x-axis direction (x axis) refers to a direction orthogonal to the z-axis direction (z axis), and a y-axis direction refers to a direction orthogonal to both the z-axis direction and the x-axis direction.

Figure 1:
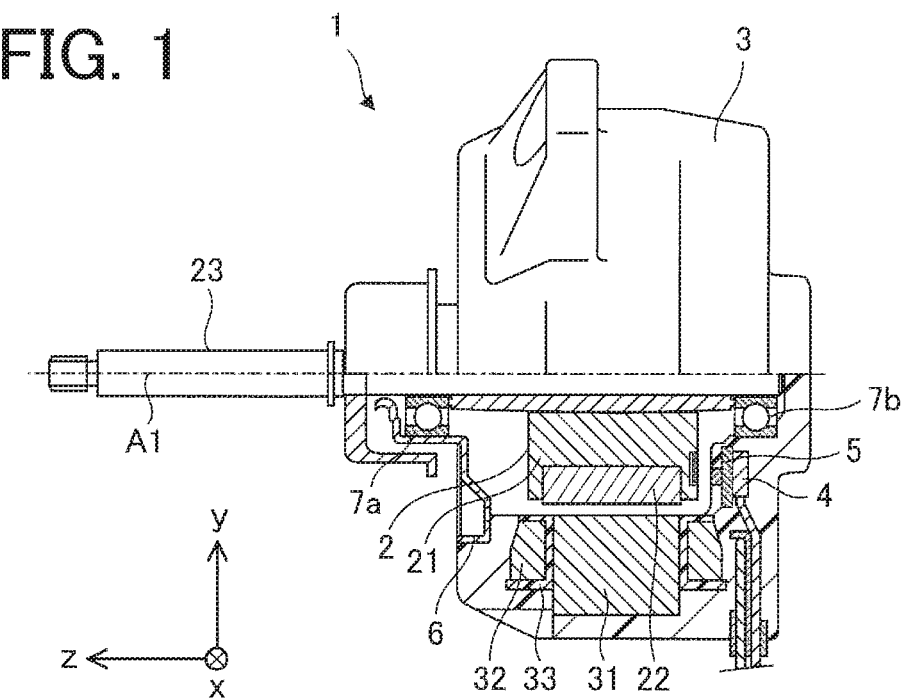
FIG. 1 is a cross-sectional view schematically illustrating an internal structure of an electric motor according to a first embodiment of the present invention.

FIG. 1 is a cross-sectional view schematically illustrating an internal structure of the electric motor 1 according to the first embodiment of the present invention.

The electric motor 1 includes a rotor 2, a stator 3, a board 4 on which electronic components such as a control circuit are mounted, a magnetic sensor 5 for detecting a rotation position of the rotor 2, a bracket 6, and bearings 7a and 7b. The electric motor 1 is, for example, an interior permanent magnet electric motor.

The rotor 2 includes a rotor core 21, a plurality of permanent magnets 22, and a shaft 23. A rotational shaft of the rotor 2 coincides with the axis line A1.

The stator 3 includes a stator core 31, a coil 32, and an insulator 33. The stator core 31 is formed by, for example, stacking a plurality of electromagnetic steel sheets. The stator core 31 is formed circularly. The coil 32 is formed by, for example, winding a lead wire around teeth 31a of the stator core 31 with the insulator 33 in between. The coil 32 is insulated by the insulator 33. In the present embodiment, the stator core 31, the coil 32, and the insulator 33 are covered with a thermoplastic resin (molding resin) such as unsaturated polyester.

The rotor 2 is inserted inside the stator 3 with a gap in between. The bracket 6 is press-fitted in an opening on a load side of the stator 3. The shaft 23 is inserted in the bearing 7a, and the bearing 7a is fixed on the load side of the stator 3. Similarly, the shaft 23 is inserted in the bearing 7b, and the bearing 7b is fixed at a counter-load side of the stator 3.

A structure of the rotor core 21 will be described.

Figure 2:
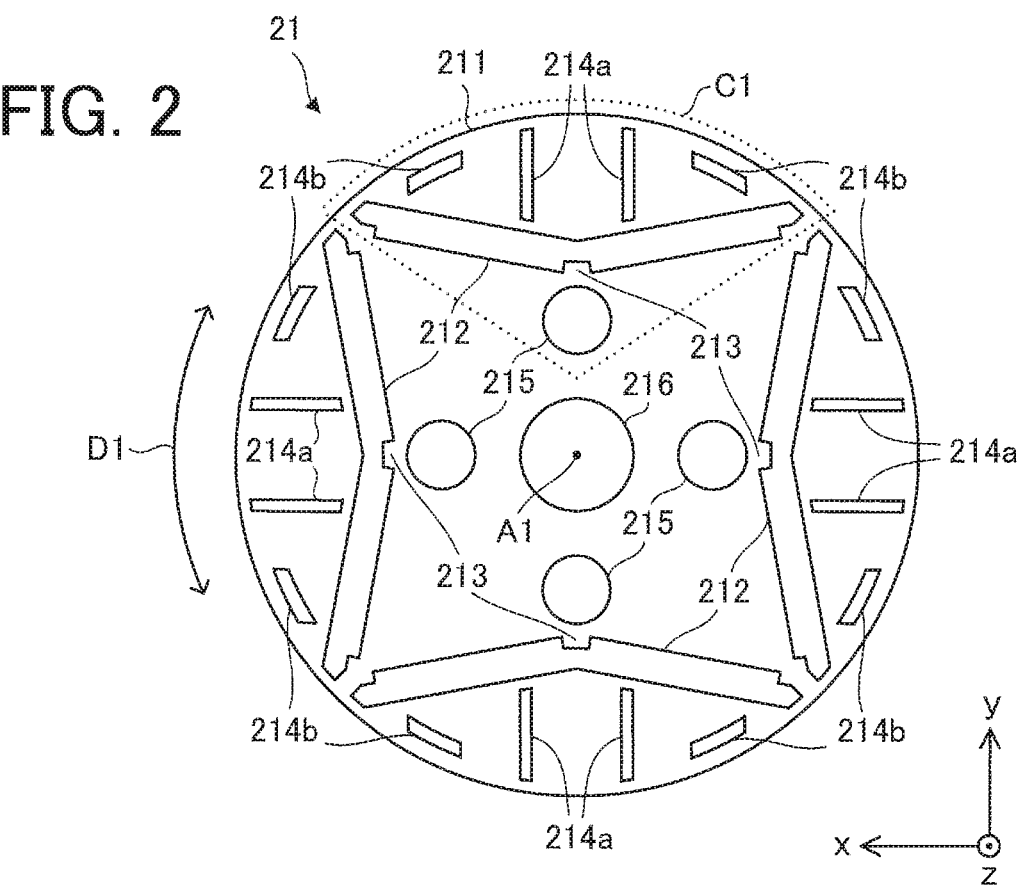
FIG. 2 is a plan view schematically illustrating a structure of a rotor core.

FIG. 2 is a plan view schematically illustrating a structure of the rotor core 21. An arrow D1 represents a circumferential direction of the rotor core 21, the rotor 2, and the stator core 31. That is, the arrow D1 represents a direction along outer circumferences of the rotor core 21, the rotor 2, and the stator core 31.

The rotor core 21 is formed by stacking a plurality of thin electromagnetic steel sheets 211. In the present embodiment, each of the electromagnetic steel sheets 211 has a thickness t of 0.1 mm to 1 mm. In the present embodiment, the electromagnetic steel sheets 211 are formed in a predetermined shape. That is, in the present embodiment, the plurality of electromagnetic steel sheets 211 have the same structure. However, the plurality of electromagnetic steel sheets 211 may include an electromagnetic steel sheet having a different structure.

Each of the electromagnetic steel sheets 211 includes at least one magnet insertion hole 212, at least one projection 213 (permanent magnet positioning projection), at least one slit 214a (first slit), at least one slit 214b (second slit), at least one space 215, and a shaft hole 216.

In the present embodiment, a plurality of magnet insertion holes 212 (e.g., four magnet insertion holes 212) are formed in each of the electromagnetic steel sheets 211, at regular intervals (equiangular intervals) in the circumferential direction about the axial center of the rotor core 21 (i.e., the axis line A1). In the present embodiment, each of the magnet insertion holes 212 passes in the axial direction.

The projection 213 is formed to project toward the inside of the magnet insertion hole 212. In the present embodiment, the projection 213 is formed to project outward in a radial direction of the rotor 2 (rotor core 21) (hereinafter also simply referred to as a "radial direction") at a position facing a center portion of the magnet insertion hole 212. That is, the projecting direction of the projection 213 is the radial direction of the rotor 2 (rotor core 21). However, the projection 213 may project in a direction except the radial direction.

Two or more projections 213 may be formed for one magnet insertion hole 212. In consideration of space where the permanent magnets 22 are disposed, however, one projection 213 is preferably formed for one magnet insertion hole 212.

Figure 3A:
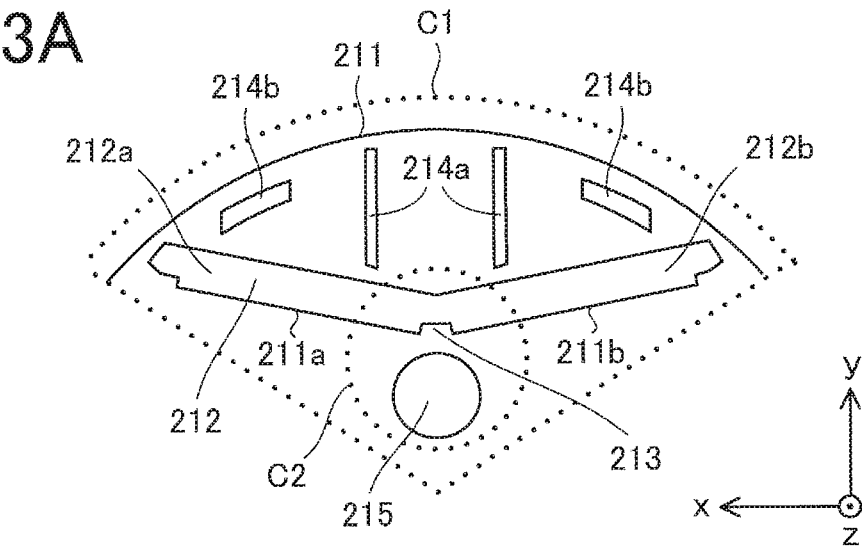
FIG. 3A is an enlarged view illustrating a region C1 indicated by a dotted line in FIG. 2.
Figure 3B:
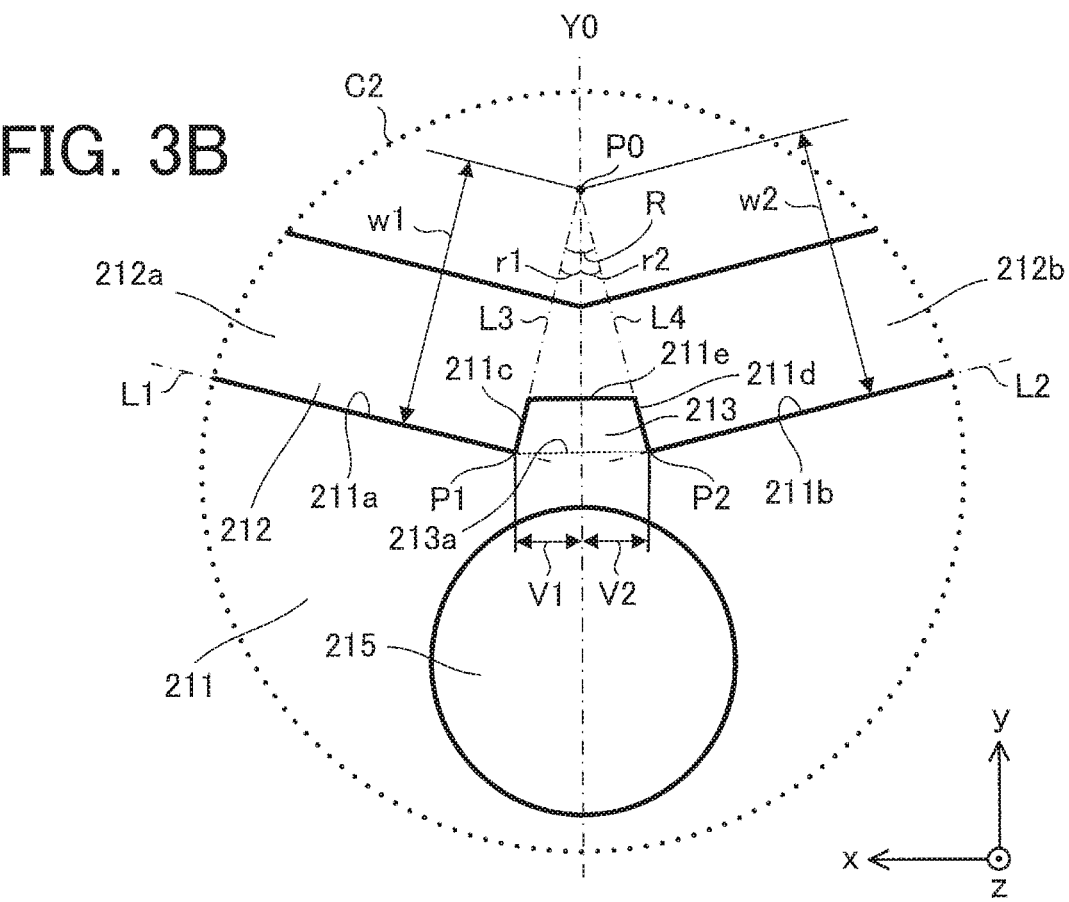
FIG. 3B is an enlarged view illustrating a region C2 indicated by a dotted line in FIG. 3A.

FIG. 3A is an enlarged view illustrating a region C1 indicated by a dotted line in FIG. 2, and FIG. 3B is an enlarged view illustrating a region C2 indicated by a dotted line in FIG. 3A. A straight line Y0 is a straight line (imaginary line) passing through the axial center of the rotor core 21 and parallel to the radial direction. That is, the straight line Y0 passes through the center of one magnetic pole in the rotor 2. In the example illustrated in FIG. 3B, the straight line Y0 orthogonally intersects with the x axis and the z axis, and is parallel to the y axis.

Figure 4A:
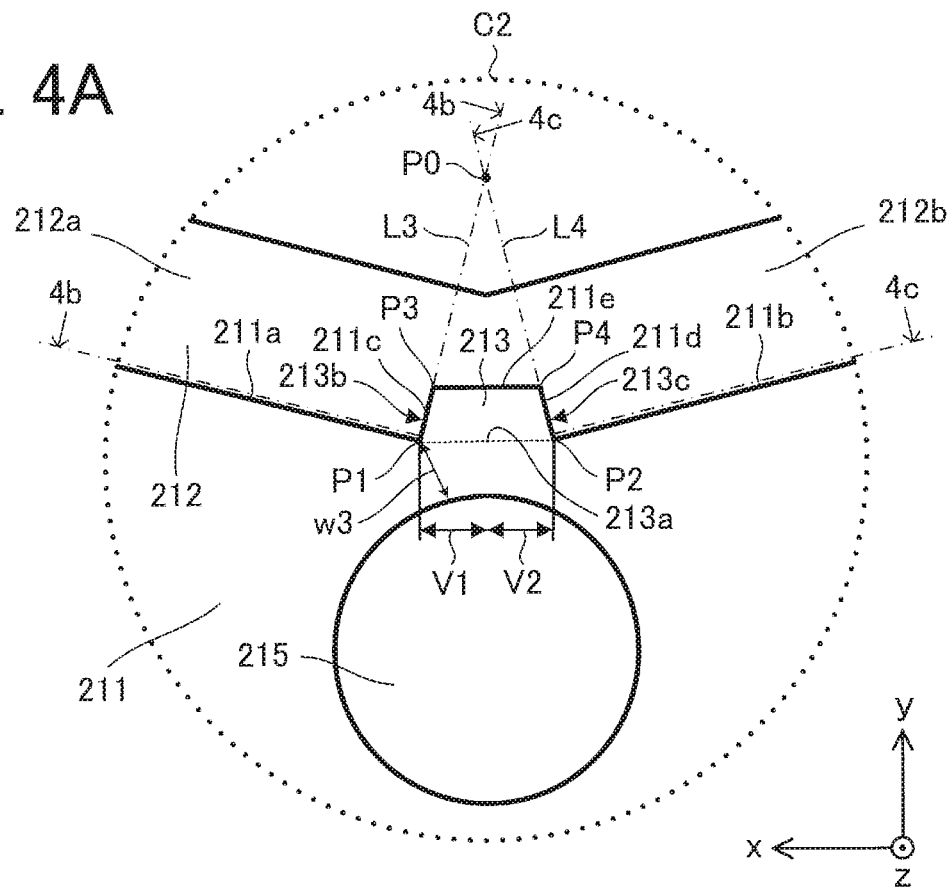
FIG. 4A is an enlarged view illustrating the region C2 indicated by the dotted line in FIG. 3A.
Figure 4B:
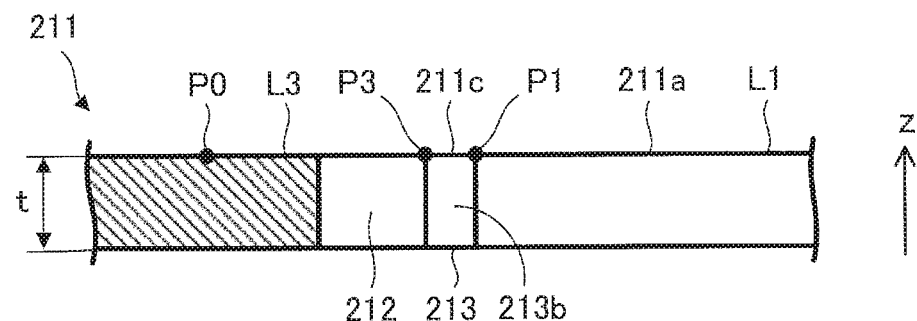
FIG. 4B is a cross-sectional view of an electromagnetic steel sheet illustrated in FIG. 4A taken along line 4b-4b.
Figure 4C:
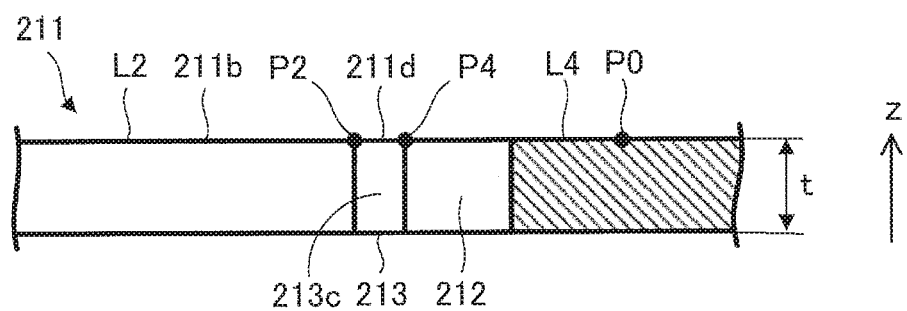
FIG. 4C is a cross-sectional view of the electromagnetic steel sheet illustrated in FIG. 4A taken along line 4c-4c.

FIG. 4A is an enlarged view illustrating the region C2 indicated by the dotted line in FIG. 3A, FIG. 4B is a cross-sectional view of the electromagnetic steel sheet 211 illustrated in FIG. 4A taken along line 4b-4b, and FIG. 4C is a cross-sectional view of the electromagnetic steel sheet 211 illustrated in FIG. 4A taken along line 4c-4c.

As illustrated in FIGS. 3A and 3B, each of the electromagnetic steel sheets 211 includes a first end part 211a, a second end part 211b, a third end part 211c, a fourth end part 211d, and a fifth end part 211e. In the present embodiment, the first end part 211a, the second end part 211b, the third end part 211c, the fourth end part 211d, and the fifth end part 211e are located on the same plane (xy plane). More specifically, as illustrated in FIGS. 4A through 4C, the first end part 211a, the second end part 211b, the third end part 211c, the fourth end part 211d, and the fifth end part 211e are located on a surface of the electromagnetic steel sheet 211 in the z-axis direction.

The first end part 211a, the second end part 211b, the third end part 211c, the fourth end part 211d, and the fifth end part 211e extend in a direction orthogonal to the rotational shaft of the rotor 2 (a direction orthogonal to the z axis). In the present embodiment, although each of the first end part 211a, the second end part 211b, the third end part 211c, the fourth end part 211d, and the fifth end part 211e is formed straight, the shapes of these end parts are not limited to straight shapes.

The first end part 211a, the second end part 211b, the third end part 211c, the fourth end part 211d, and the fifth end part 211e define the magnet insertion hole 212 (specifically, a part of the magnet insertion hole 212). The first end part 211a and the third end part 211c define a first region 212a (specifically, a part of the first region 212a) that is a part of the magnet insertion hole 212. The second end part 211b and the fourth end part 211d define a second region 212b (specifically, a part of the second region 212b) that is a part of the magnet insertion hole 212. The first region 212a and the second region 212b communicate with each other.

In a case where two permanent magnets 22 are placed in one magnet insertion hole 212, the first end part 211a and the third end part 211c face the permanent magnet 22 disposed in the first region 212a, and the second end part 211b and the fourth end part 211d face the permanent magnet 22 disposed in the second region 212b.

The third end part 211c, the fourth end part 211d, and the fifth end part 211e form the projection 213. That is, each of the third end part 211c, the fourth end part 211d, and the fifth end part 211e is also an end part of the projection 213. For example, the third end part 211c and the fourth end part 211d are linear edges forming end parts of the projection 213 in a direction orthogonal to the radial direction. The fifth end part 211e is a linear edge forming an end part of the projection 213 in the radial direction.

As illustrated in FIG. 3B, the projection 213 includes a base part 213a. Accordingly, the projection 213 is formed by the third end part 211c (the first end part of the projection 213), the fourth end part 211d (the second end part of the projection 213), the fifth end part 211e (the top of the projection 213), and the base part 213a. In the present embodiment, in the direction orthogonal to the radial direction (in the x-axis direction in FIG. 3B), the base part 213a is longer than the fifth end part 211e. In the present embodiment, the base part 213a is a part extending in the direction (the x-axis direction in FIG. 3B) orthogonal to the radial direction (the straight line Y0 in FIG. 3B). In the present embodiment, on the xy plane, the length of the base part 213a in the x-axis direction is expressed as V1+V2.

As illustrated in FIG. 3B, a straight line L1 is a straight line (imaginary line) including the first end part 211a, and a straight line L2 is a straight line (imaginary line) including the second end part 211b. As illustrated in FIG. 3B, a straight line L3 is a straight line (imaginary line) including the third end part 211c, and a straight line L4 is a straight line (imaginary line) including the fourth end part 211d. In the present embodiment, the straight lines L1, L2, L3, and L4 are straight lines (imaginary lines) located on the same plane (the xy plane). In other words, the straight lines L1, L2, L3, and L4 are straight lines (imaginary lines) in a direction orthogonal to the rotational shaft of the rotor 2 (in a direction orthogonal to the z axis).

As illustrated in FIG. 3B, the angle formed by the third end part 211c and the fourth end part 211d on the xy plane is represented by R (0°<R<180°). That is, the angle formed by the straight line L3 and the straight line L4 is R. On the xy plane, the angle formed by the straight line Y0 and the straight line L3 is represented by r1 (degrees), and the angle formed by the straight line Y0 and the straight line L4 is represented by r2 (degrees). In the present embodiment, R=r1+r2. In addition, on the xy plane, the intersection point of the straight line L3 and the straight line L4 is represented by point P0.

The point P0 is preferably located outside the electromagnetic steel sheet 211 in the radial direction so as to prevent the plurality of permanent magnets 22 disposed in the one magnet insertion hole 212 from touching each other. That is, the angle R is preferably adjusted so as to prevent the plurality of permanent magnets 22 from touching each other.

As illustrated in FIG. 3B, the intersection point of the straight line L1 and the straight line L3 is a point P1, and the intersection point of the straight line L2 and the straight line L4 is a point P2. In the present embodiment, the boundary position (boundary point) between the first end part 211a and the third end part 211c is the point P1, and the boundary position (boundary point) between the second end part 211b and the fourth end part 211d is the point P2. In this case, the base part 213a is a portion from the point P1 to the point P2. That is, in the present embodiment, the distance from the point P1 to the point P2 on the xy plane is expressed as V1+V2.

In addition, as illustrated in FIG. 4A, the intersection point of a straight line including the fifth end part 211e and the straight line L3 is a point P3, and the intersection point of a straight line including the fifth end part 211e and the straight line L4 is a point P4. The third end part 211c may be a linear edge (line segment) having an arbitrary length and located between the point P1 and the point P3. The fourth end part 211d may be a linear edge (line segment) having an arbitrary length and located between the point P2 and the point P4. In the present embodiment, the boundary position (boundary point) between the third end part 211c and the fifth end part 211e is the point P3, and the boundary position (boundary point) between the fourth end part 211d the fifth end part 211e is the point P4.

As illustrated in FIGS. 4B and 4C, the projection 213 has a first end face 213b and a second end face 213c. The first end face 213b includes the third end part 211c and faces a first permanent magnet 22a described later. The second end face 213c includes the fourth end part 211d and faces a second permanent magnet 22b described later.

The fifth end part 211e is formed at a position separated from the base part 213a outward in the radial direction, and defines the magnet insertion hole 212 (specifically, a part of the magnet insertion hole 212). Accordingly, the first region 212a and the second region 212b communicate with each other.

The rotor 2 (specifically, the electromagnetic steel sheets 211) satisfies the following expression (1):

$$t \leq 2 \times w \times \sin(R/2) \leq 2 \times t \tag{1}$$

where t is a thickness of one electromagnetic steel sheet 211, and w (w1 in FIG. 3B) is a distance from the intersection point P1 of the straight line L1 and the straight line L3 to the point P0.

Similarly, the rotor 2 (specifically, the electromagnetic steel sheets 211) satisfies the expression (1), where t is the thickness of one electromagnetic steel sheet 211, and w (w2 in FIG. 3B) is a distance from the intersection point P2 of the straight line L2 and the straight line L4 to the point P0.

In the present embodiment, the distances w1 and w2 are equal to each other, but may be different from each other. In addition, in the present embodiment, the angles r1 and r2 are equal to each other, but may be different from each other.

As illustrated in FIG. 3B, the following equations (2) and (3) are derived:

$$w1 \times \sin(r1) = V1 \tag{2}$$

$$w2 \times \sin(r2) = V2 \tag{3}$$

where if w=w1=w2, and r1=r2, the following equation is derived:

$$V1 + V2 = w1 \times \sin(r1) + w2 \times \sin(r2)$$
$$= 2 \times w \times \sin(R/2)$$

Thus, from the above equation (1), if w1=w2, and r1=r2, the rotor 2 (specifically, the electromagnetic steel sheets 211) satisfies the following expression (4):

$$t \leq V1 + V2 \leq 2 \times t \tag{4}$$

In the present embodiment, in each electromagnetic steel sheet 211, a plurality of slits 214a and a plurality of slits 214b are formed outside the magnet insertion holes 212 in the radial direction. Specifically, two slits 214a are formed for one magnet insertion hole 212 (one magnetic pole), and two slits 214b are formed for one magnet insertion hole 212 (one magnetic pole).

The slits 214a are radially elongated spaces. In other words, the slits 214a are formed in directions except a direction along a concentric circle about the axis line A1 on the xy plane. In the present embodiment, the slits 214a are formed closer to the projection 213 than both ends of the magnet insertion hole 212 in the direction (x-axis direction in FIG. 3A) orthogonal to the radial direction.

The slits 214b are circumferentially elongated spaces. In the present embodiment, the slits 214b are formed closer to both ends of the magnet insertion hole 212 than the projection 213 in the direction (x-axis direction in FIG. 3A) orthogonal to the radial direction.

The slits 214a and the slits 214b can reduce pulsation of a torque and harmonics of an induced voltage.

The space 215 is formed inside the magnet insertion hole 212 in the radial direction. In other words, the space 215 is formed at a position adjacent to the projection 213. In consideration of punching (press working) to the electromagnetic steel sheet 211, a minimum distance w3 from the space 215 to the magnet insertion hole 212 (FIG. 4A) is preferably t or more and 2×t or less, where t is a thickness of the electromagnetic steel sheet 211. In the present embodiment, the shape of the space 215 on the xy plane is a circle, but may be other shapes except circles.

The shaft hole 216 (FIG. 2) is a through hole in which shaft 23 is inserted.

Figure 5:
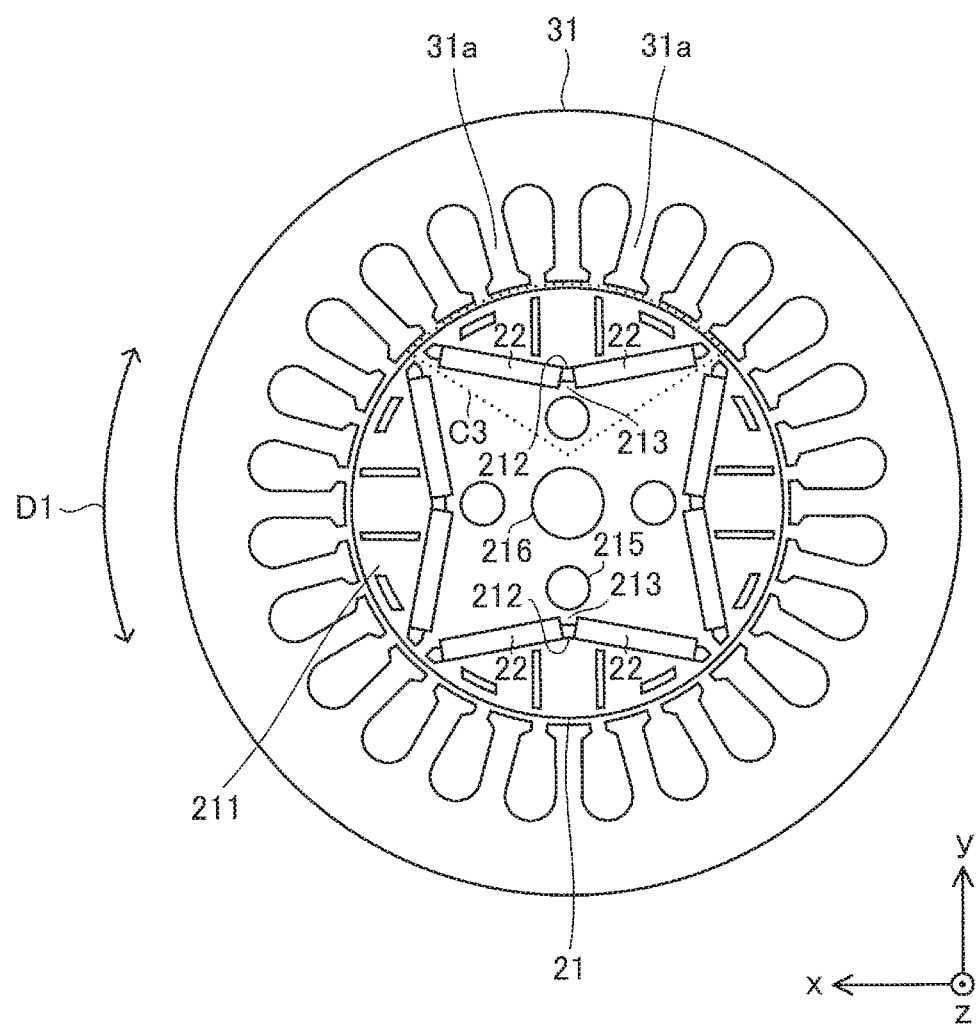
FIG. 5 is a plan view schematically illustrating structures of a rotor core where permanent magnets are disposed and a stator core.

FIG. 5 is a plan view schematically illustrating structures of the rotor core 21 where the permanent magnets 22 are disposed and the stator core 31.

The stator core 31 includes the plurality of teeth 31a formed in the circumference direction indicated by the arrow D1. Each of the teeth 31a extends in the radial direction of the stator core 31. The rotor core 21 is disposed inside the stator 3 with a gap in between.

Two or more permanent magnets 22 are disposed in one magnet insertion hole 212. In the present embodiment, two permanent magnets 22 are disposed in one magnet insertion hole 212.

The rotor 2 has only to have two or more poles. In the present embodiment, the rotor 2 includes four poles (four magnetic poles). In the present embodiment, one magnetic pole of the rotor 2 is formed by two permanent magnets 22 disposed in one magnet insertion hole 212. The permanent magnets 22 are neodymium-iron-boron (Nd—Fe—B)-based rare-earth magnets. However, the permanent magnets 22 are not limited to the type given as an example in the present embodiment, and may be made of other materials. The power of the electric motor 1 can be increased by increasing the width (e.g., width in the radial direction) of the permanent magnets 22.

Figure 6A:
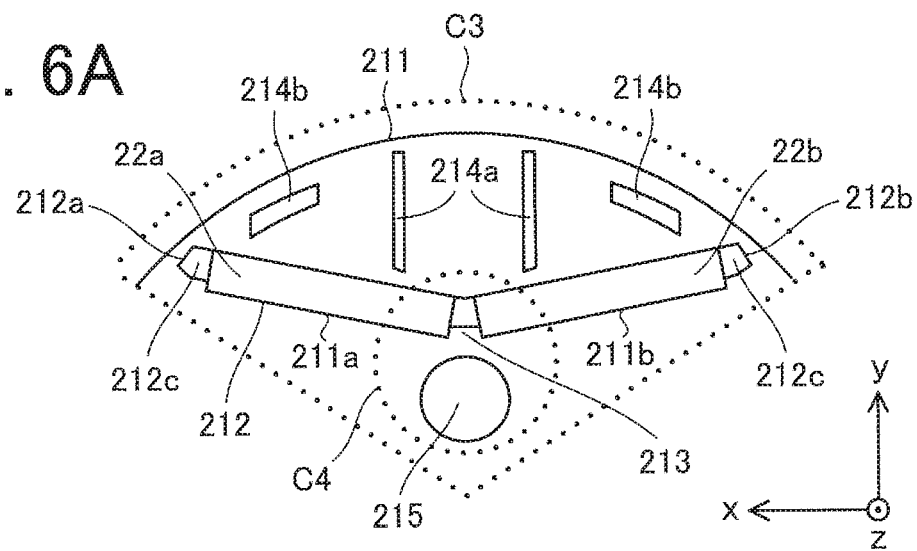
FIG. 6A is an enlarged view illustrating a region C3 indicated by a dotted line in FIG. 5.
Figure 6B:
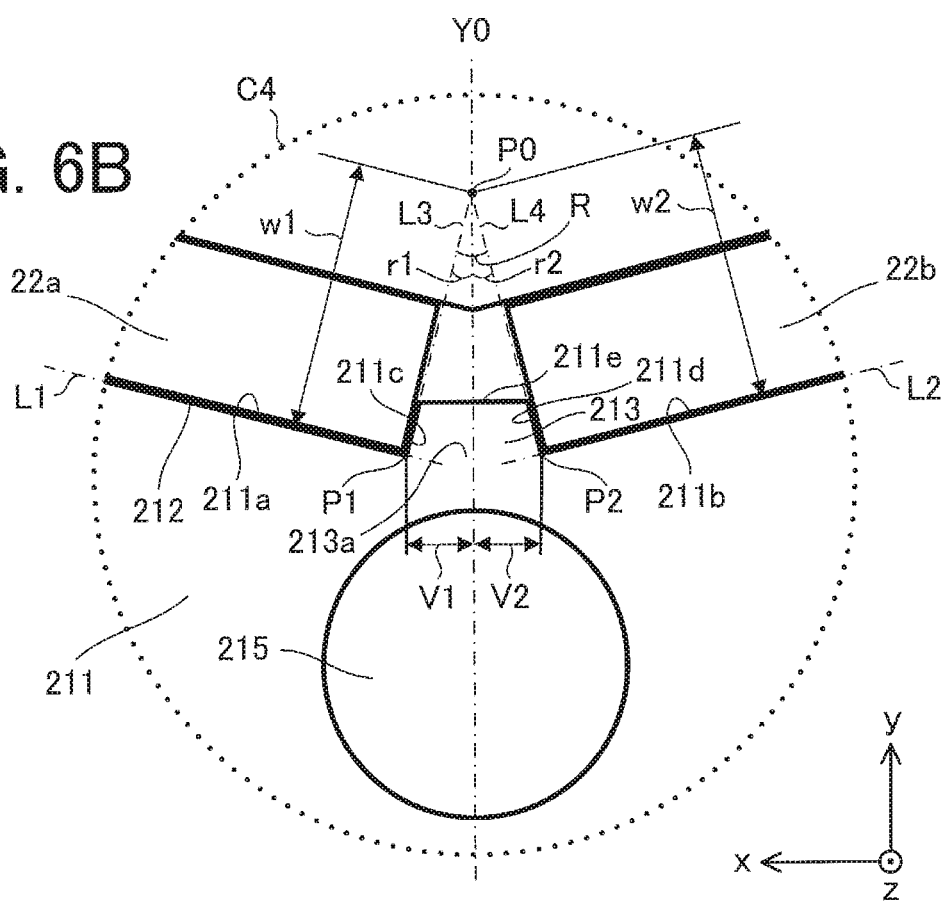
FIG. 6B is an enlarged view illustrating a region C4 indicated by a dotted line in FIG. 6A.

FIG. 6A is an enlarged view illustrating the region C3 indicated by a dotted line in FIG. 5, and FIG. 6B is an enlarged view illustrating the region C4 indicated by a dotted line in FIG. 6A.

The first permanent magnet 22a of the permanent magnets 22 is disposed in the first region 212a of the magnet insertion hole 212. The second permanent magnet 22b of the permanent magnets 22 is disposed in the second region 212b of the magnet insertion hole 212. In the present embodiment, each magnet insertion hole 212 has a V shape on the xy plane. Thus, in one magnet insertion hole 212, two permanent magnets 22 (the first permanent magnet 22a and the second permanent magnet 22b) are disposed in a V shape.

The magnetization directions (the directions of magnetization) of the plurality of permanent magnets 22 are the same as each other. The two permanent magnets 22 disposed in the one magnet insertion hole 212 are the same as each other in positional relationship between magnetic poles (the north pole and the south pole). For example, when the first permanent magnet 22a is disposed in the magnet insertion hole 212 in such a manner that the north pole of the first permanent magnet 22a faces radially outward, the second permanent magnet 22b is disposed in the magnet insertion hole 212 in such a manner that the north pole of the second permanent magnet 22b also faces radially outward.

The projection 213 is formed between the first permanent magnet 22a and the second permanent magnet 22b inserted in the magnet insertion hole 212. The two permanent magnets 22 are positioned by the projection 213 in the magnet insertion hole 212. Accordingly, contact between the two permanent magnets 22 can be prevented.

In the present embodiment, the first end face 213b (FIG. 4B) is flat, and is in contact with the first permanent magnet 22a. In the present embodiment, at least the third end part 211c of the first end face 213b is in contact with the first permanent magnet 22a. Similarly, in the present embodiment, the second end face 213c (FIG. 4C) is flat, and is in contact with the second permanent magnet 22b. In the present embodiment, at least the fourth end part 211d of the second end face 213c is in contact with the second permanent magnet 22b. The first end face 213b and the second end face 213c do not need to be in contact with the permanent magnets 22.

The third end part 211c does not need to be in contact with the first permanent magnet 22a. In this case, a portion except the third end part 211c may be in contact with the first permanent magnet 22a. Similarly, the fourth end part 211d does not need to be in contact with the second permanent magnet 22b. In this case, a part except the fourth end part 211d may be in contact with the second permanent magnet 22b.

In a case where the third end part 211c is not in the shape of a straight line, a straight line including a tangent in a contact portion of the third end part 211c in contact with the first permanent magnet 22a may be set as the straight line L3. Similarly, in a case where the fourth end part 211d is not in the shape of a straight line, a straight line including a tangent in a contact portion of the fourth end part 211d in contact with the second permanent magnet 22b may be set as the straight line L4. In addition, in a case where each of the third end part 211c and the fourth end part 211d is not in the shape of a straight line, the angle formed by an end face of the first permanent magnet 22a facing the third end part 211c and an end face of the second permanent magnet 22b facing the fourth end part 211d may be set as R.

As illustrated in FIG. 6A, spaces 212c that are regions as parts of the magnet insertion hole 212 may be formed at both ends of the magnet insertion hole 212 in the direction orthogonal to the radial direction. Accordingly, leakage of the magnetic flux from the permanent magnets 22 between adjacent magnet insertion holes 212 can be suppressed.

First Variation

Figure 7A:
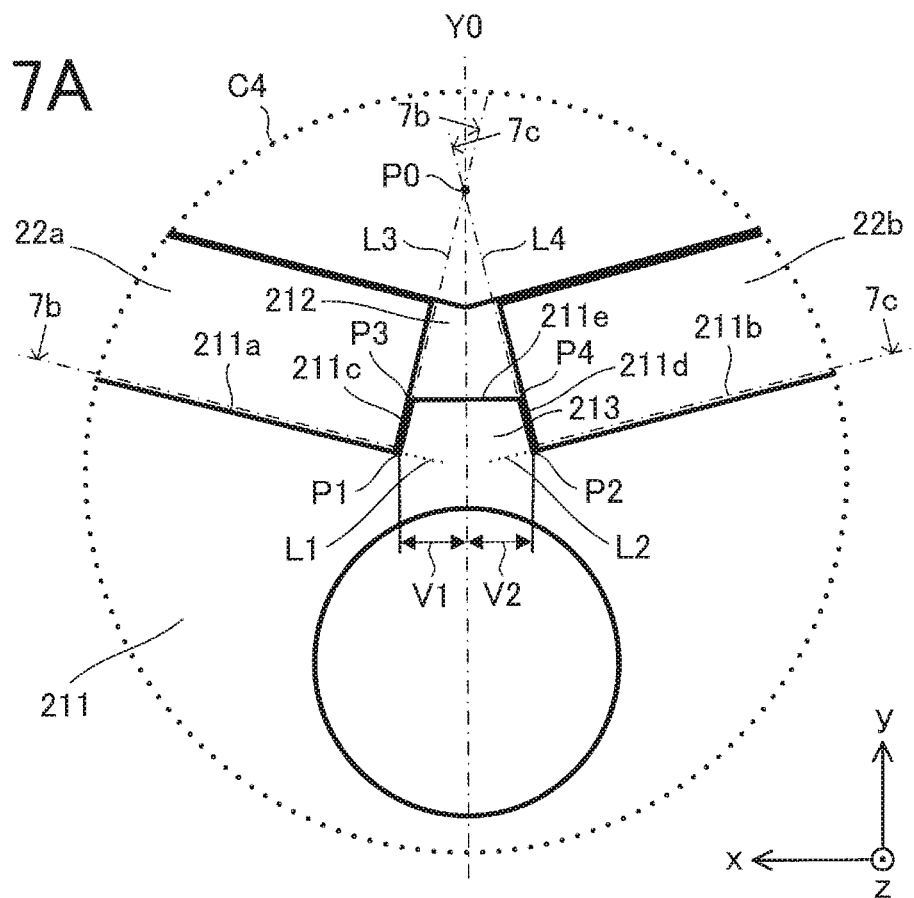
FIG. 7A is an enlarged view of an electromagnetic steel sheet of an electric motor according to a first variation illustrating the region C4 indicated by the dotted line in FIG. 6A.
Figure 7B:
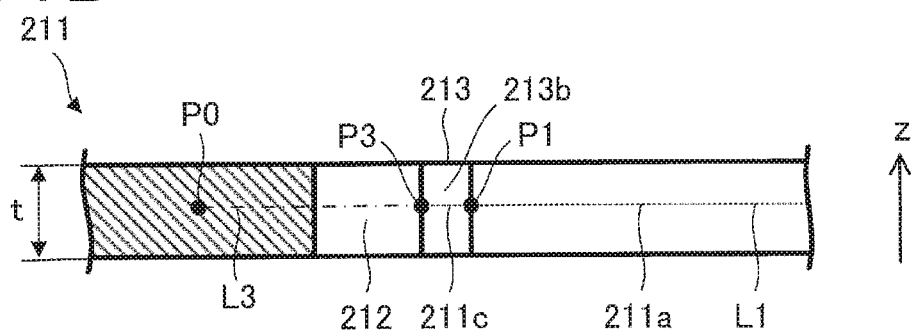
FIG. 7B is a cross-sectional view of the electromagnetic steel sheet illustrated in FIG. 7A taken along line 7b-7b.
Figure 7C:
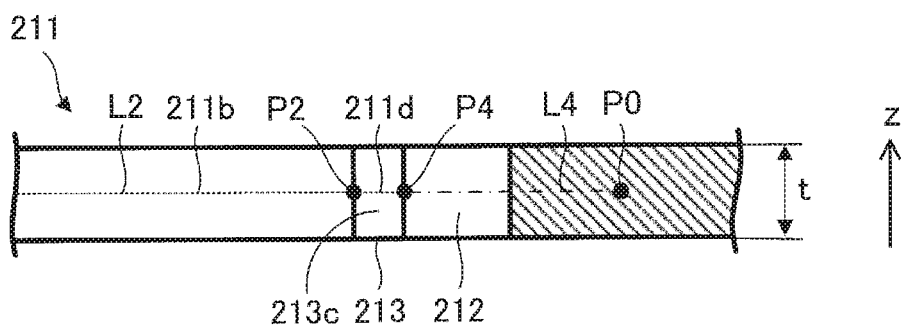
FIG. 7C is a cross-sectional view of the electromagnetic steel sheet illustrated in FIG. 7A taken along line 7c-7c.

FIG. 7A is an enlarged view of an electromagnetic steel sheet 211 of an electric motor according to a first variation illustrating the region C4 indicated by the dotted line in FIG. 6A, FIG. 7B is a cross-sectional view of the electromagnetic steel sheet 211 illustrated in FIG. 7A taken along line 7b-7b, and FIG. 7C is a cross-sectional view of the electromagnetic steel sheet 211 illustrated in FIG. 7A taken along line 7c-7c. The electromagnetic steel sheets 211 in the first variation illustrated in FIGS. 7A through 7C are different from the electromagnetic steel sheets 211 of the rotor 2 in the first embodiment in the positions of the first end part 211a, the second end part 211b, the third end part 211c, the fourth end part 211d, and the fifth end part 211e in the z-axis direction, and are the same as those in the first embodiment in the other respects.

That is, as illustrated in FIGS. 7B and 7C, the first end part 211a, the second end part 211b, the third end part 211c, the fourth end part 211d, and the fifth end part 211e can be set at arbitrary positions in the z-axis direction. However, in the first variation, the first end part 211a, the second end part 211b, the third end part 211c, the fourth end part 211d, and the fifth end part 211e are located on the same plane (xy plane).

According to the first variation, advantages similar to those of the first embodiment can be obtained.

Second Variation

Figure 8A:
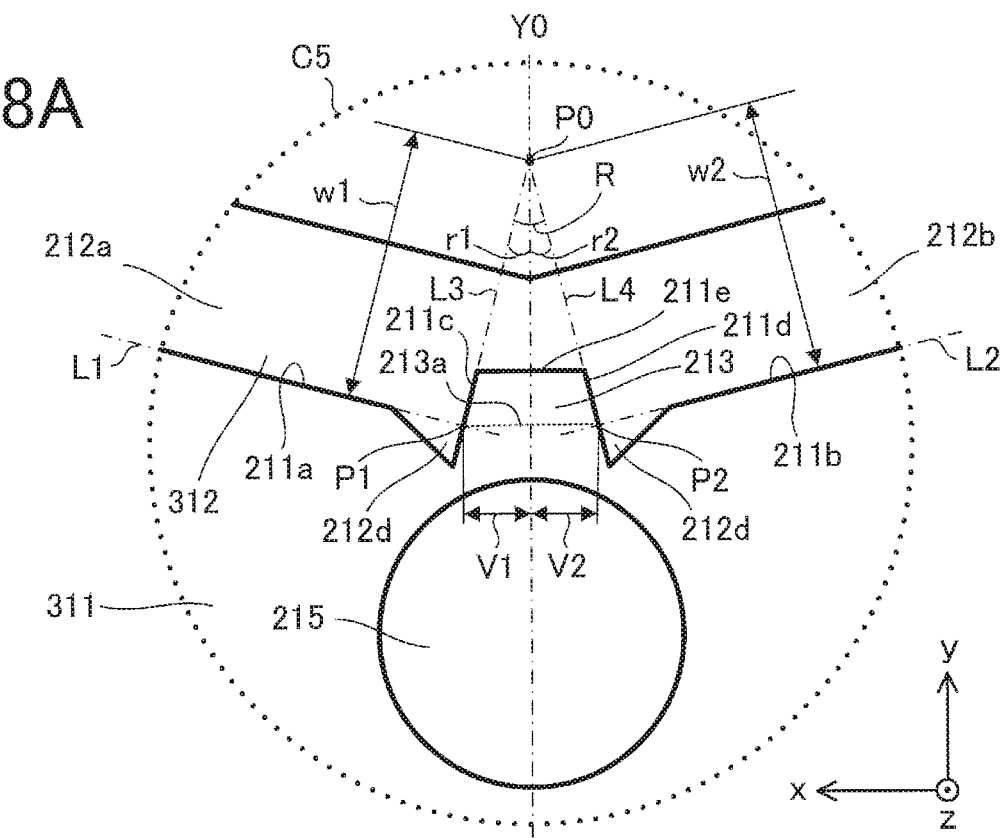
FIG. 8A is an enlarged view illustrating a structure of a part of an electromagnetic steel sheet of an electric motor according to a second variation.
Figure 8B:
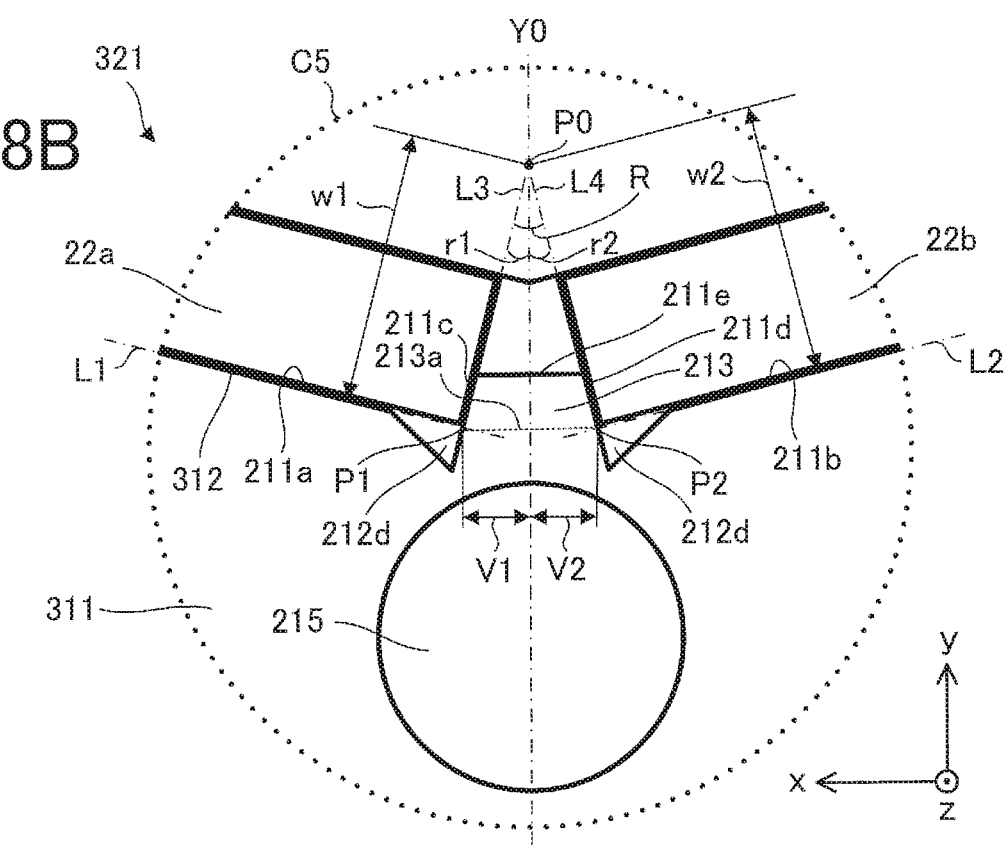
FIG. 8B is an enlarged view illustrating a structure of a part of an electromagnetic steel sheet of a rotor core where permanent magnets are disposed.

FIG. 8A is an enlarged view illustrating a structure of a part of an electromagnetic steel sheet 311 in an electric motor according to a second variation. FIG. 8B is an enlarged view illustrating a structure of a part of the electromagnetic steel sheet 311 of a rotor core 321 where permanent magnets 22 are disposed. A region C5 illustrated in FIGS. 8A and 8B corresponds to the region C1 illustrated in FIG. 2. The rotor core 321 (specifically, the electromagnetic steel sheet 311) is different from the rotor core 21 (specifically, the electromagnetic steel sheet 211) of the rotor 2 in the first embodiment in the structure of a magnet insertion hole 312, and is the same as the rotor core 21 in the other respects. The rotor core 321 is applicable to the rotor 2 of the electric motor 1 according to the first embodiment, instead of the rotor core 21.

The rotor core 321 is formed by stacking a plurality of thin electromagnetic steel sheets 311. Each magnet insertion hole 312 has at least one clearance groove 212d (clearance part) formed to allow an angular portion of the permanent magnet 22 to be released. In the example illustrated in FIGS. 8A and 8B, two clearance grooves 212d are formed at positions adjacent to the first end part 211a and the third end part 211c. In other words, two clearance grooves 212d are formed at positions adjacent to the second end part 211b and the fourth end part 211d.

In this case, in a manner similar to the rotor core 21 described with reference to FIG. 3B, the intersection point of the straight line L1 and the straight line L3 is the point P1, and the intersection point of the straight line L2 and the straight line L4 is the point P2. Thus, in a manner similar to the first embodiment, the distance w1 is the distance from the intersection point P1 to the point P0. Similarly, the distance w2 is the distance from the intersection point P2 to the point P0.

According to the second variation, even in a case where angular portions of permanent magnets 22 (a first permanent magnet 22a and a second permanent magnet 22b in the example illustrated in FIG. 8B) project, the angular portions of the permanent magnets 22 can be released to the clearance grooves 212d. Accordingly, damage to the permanent magnets 22 can be prevented.

Third Variation

Figure 9:
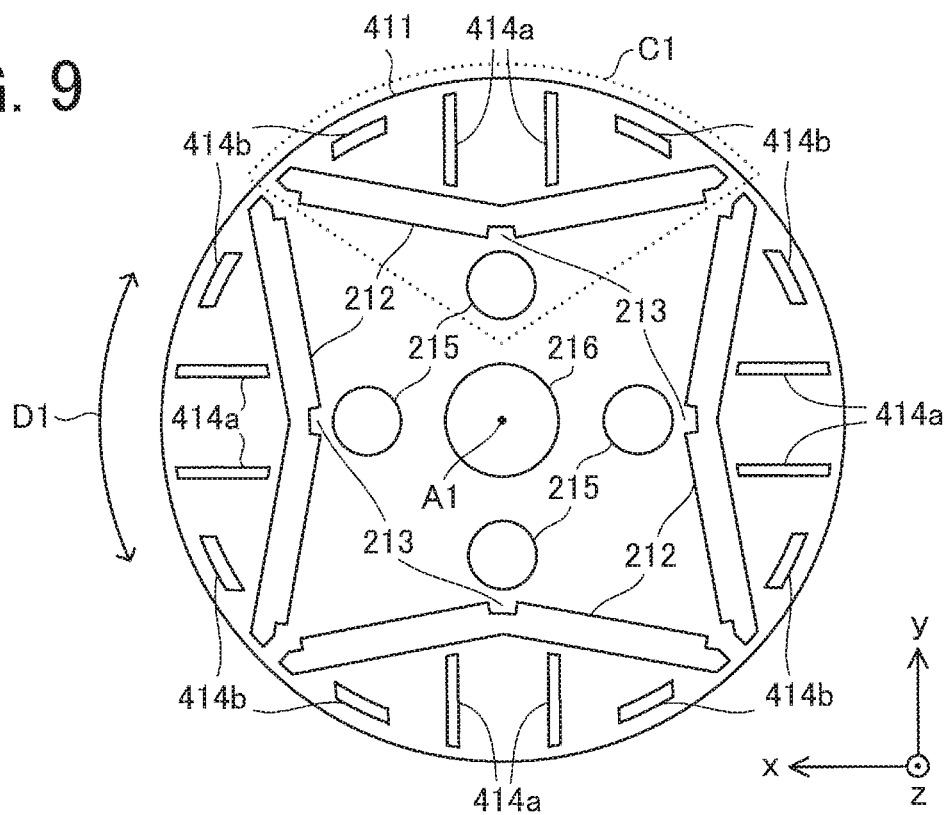
FIG. 9 is a plan view illustrating a structure of an electromagnetic steel sheet of an electric motor according to a third variation.

FIG. 9 is a plan view illustrating a structure of an electromagnetic steel sheet 411 of an electric motor according to a third variation. The electromagnetic steel sheet 411 has at least one hollow 414a (first hollow) and at least one hollow 414b (second hollow), instead of the slits 214a and 214b. The electromagnetic steel sheet 411 is different from the electromagnetic steel sheet 211 of the electric motor 1 according to the first embodiment in this respect, and is the same as that of the first embodiment in the other respects. The electromagnetic steel sheet 411 is applicable to the rotor 2 of the electric motor 1 according to the first embodiment, instead of the electromagnetic steel sheet 211.

A rotor core of the electric motor according to the third variation is formed by stacking a plurality of thin electromagnetic steel sheet 411. In the third variation, in the electromagnetic steel sheet 411, a plurality of hollows 414a and a plurality of hollows 414b are formed outside the magnet insertion holes 212 in the radial direction.

Specifically, two hollows 414a are formed for one magnet insertion hole 212 (one magnetic pole), and two hollows 414b are formed for one magnet insertion hole 212 (one magnetic pole).

The hollows 414a are elongated in the radial direction. In other words, each of the hollows 414a is formed in a direction except a direction along a concentric circle about the axis line A1 on the xy plane. For example, the hollows 414a are grooves formed when the electromagnetic steel sheets 411 are fixed to each other by caulking. In the third variation, the hollows 414a are formed at positions closer to the projection 213 than both ends of the magnet insertion hole 212 in the direction orthogonal to the radial direction.

The hollows 414b are elongated in the circumferential direction. For example, the hollows 414b are grooves formed when the electromagnetic steel sheets 411 are fixed to each other by caulking. In the third variation, the hollows 414b are formed at positions closer to both ends of the magnet insertion hole 212 than the projection 213 in the direction orthogonal to the radial direction.

In the third variation, the hollows 414a and the hollows 414b can reduce pulsation of a torque and harmonics of an induced voltage.

Fourth Variation

Figure 10:
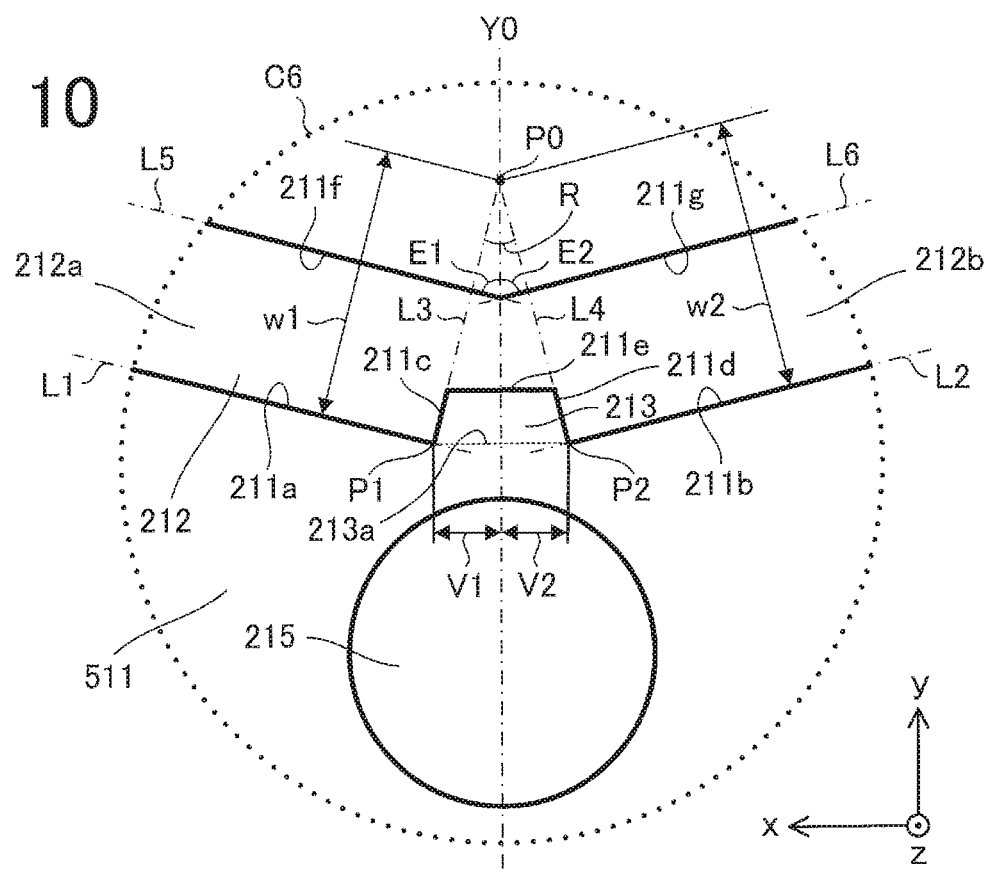
FIG. 10 is an enlarged view illustrating a structure of a part of an electromagnetic steel sheet of an electric motor according to a fourth variation.

FIG. 10 is an enlarged view illustrating a structure of a part of an electromagnetic steel sheet 511 of an electric motor according to a fourth variation. A region C6 illustrated in FIG. 10 corresponds to the region C2 illustrated in in FIG. 3A. The electromagnetic steel sheet 511 further specifies conditions for the structure of the electromagnetic steel sheet 511 as compared to the electromagnetic steel sheet 211 in the first embodiment. The electromagnetic steel sheet 511 is applicable to the rotor 2 of the electric motor 1 according to the first embodiment, instead of the electromagnetic steel sheet 211.

As illustrated in FIG. 10, each of the magnet insertion holes 212 includes a sixth end part 211f and a seventh end part 211g in addition to the first end part 211a, the second end part 211b, the third end part 211c, the fourth end part 211d, and the fifth end part 211e. The sixth end part 211f defines a first region 212a (specifically, a part of the first region 212a) that is a part of the magnet insertion hole 212. The seventh end part 211g defines a second region 212b (specifically, a part of the second region 212b) that is a part of the magnet insertion hole 212.

The first end part 211a, the second end part 211b, the third end part 211c, the fourth end part 211d, the fifth end part 211e, the sixth end part 211f, and the seventh end part 211g are located on the same plane (xy plane). In the fourth variation, although each of the first end part 211a, the second end part 211b, the third end part 211c, the fourth end part 211d, the fifth end part 211e, the sixth end part 211f, and the seventh end part 211g is formed straight, the shapes of these parts are not limited to straight shapes.

Suppose a straight line (imaginary line) including the sixth end part 211f is a straight line L5, the angle formed by the straight line L5 and the straight line Y0 on the xy plane is represented by E1 (degrees). The angle formed by the straight line L3 and the straight line L4 on the xy plane is represented by R (where 0°<R<180°). In this case, the electromagnetic steel sheet 511 satisfies the equation of E1=180°−{(R/2)+90°}.

Similarly, when a straight line (imaginary line) including the seventh end part 211g is represented as a straight line L6, the angle formed by the straight line L6 and the straight line Y0 on the xy plane is represented by E2 (degrees). In this case, the electromagnetic steel sheet 511 satisfies the equation of E2=180°−{(R/2)+90°}. That is, in the fourth variation, the angles E1 and E2 are equal to each other. However, the angles E1 and E2 do not need to be equal to each other.

In addition, the electromagnetic steel sheet 511 satisfies the following expressions:

$$t \leq 2 \times w1 \times \sin \theta_1° \leq 2 \times t$$

$$\theta1=45-(w1/2)$$

where t (mm) is a thickness of one electromagnetic steel sheet 511, and w1 (mm) is a distance from the point P1 to the point P0.

Similarly, the electromagnetic steel sheet 511 also satisfies the following expressions:

$$t \leq 2 \times w2 \times \sin \theta_2° \leq 2 \times t$$

$$\theta2=45-(w2/2)$$

where w2 (mm) is a distance from the point P2 to the point P0.

When the conditions described in the fourth variation are satisfied, advantages similar to those of the first embodiment can be obtained.

An example of a method for manufacturing the electric motor 1 will be described as follows.

Figure 11:
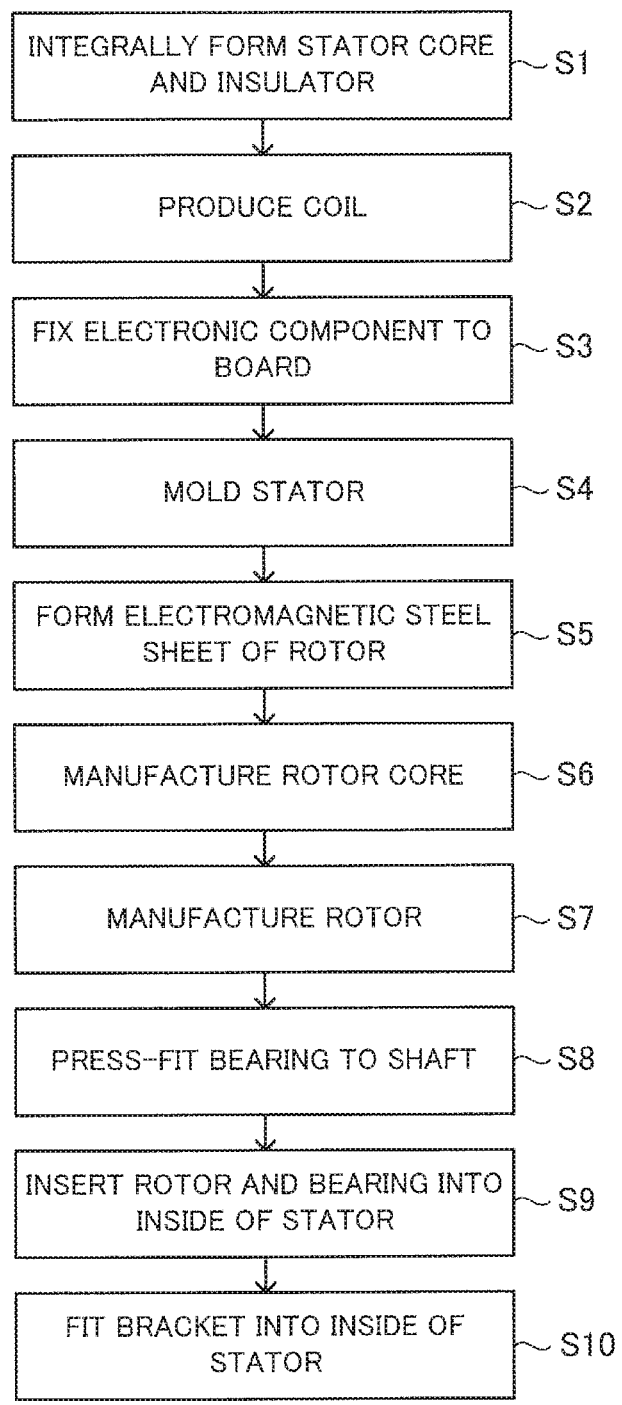
FIG. 11 is a flowchart showing an example of a method for manufacturing an electric motor.

FIG. 11 is a flowchart showing an example of a method for manufacturing the electric motor 1. The method for manufacturing the electric motor 1 includes steps described as follows.

In step S1, a stator core 31 and an insulator 33 are integrally formed. The stator core 31 is formed by stacking a plurality of electromagnetic steel sheets.

In step S2, a lead wire is wound around the integrally formed stator core 31 and insulator 33, thereby producing a coil 32.

In step S3, electronic components such as a control circuit and a magnetic sensor 5 are fixed to a board 4.

In step S4, the board 4 on which the electronic components are fixed and the stator core 31 are filled with a molding resin, thereby molding a stator 3.

In step S5, at least one magnet insertion hole 212 and a shaft hole 216 are formed in each of the plurality of electromagnetic steel sheets 211. These holes can be formed by, for example, punching. In addition, slits 214a and 214b and a space 215 may be formed in each of the electromagnetic steel sheets 211. In this case, in at least one electromagnetic steel sheet 211, at least one magnet insertion hole 212 is formed to satisfy equation (1) described above. Each of the electromagnetic steel sheets 211 is formed to have the thickness t of 0.1 mm or more and 1 mm or less.

In step S6, the plurality of electromagnetic steel sheets 211 formed in step S5 are stacked, thereby manufacturing a rotor core 21. The plurality of electromagnetic steel sheets 211 are fixed together by, for example, caulking.

In step S7, permanent magnets 22 (e.g., a first permanent magnet 22a and a second permanent magnet 22b) are inserted in the magnet insertion hole 212 of the rotor core 21, and the shaft 23 is inserted in the shaft hole 216, thereby manufacturing a rotor 2.

In step S8, bearings 7a and 7b are press-fitted to the shaft 23.

The order from step S1 to step S8 is not limited to the order shown in FIG. 11. For example, the steps for assembling the stator 3 from step S1 to step S4 and the steps for assembling the rotor 2 from step S5 to step S7 may be performed simultaneously. The steps for assembling the rotor 2 from step S5 to step S7 may be performed before the steps for assembling the stator 3 from step S1 to step S4.

In step S9, the rotor 2 is inserted into the inside of the stator 3 formed in step S1 through step S4, together with the bearings 7a and 7b.

In step S10, a bracket 6 is fitted into the inside of the stator 3 in which the rotor 2 is inserted.

Through the foregoing steps, the electric motor 1 is assembled.

As described above, when the plurality of permanent magnets 22 (e.g., the first permanent magnet 22a and the second permanent magnet 22b) are disposed in one magnet insertion hole 212, since the projection 213 has been formed between the permanent magnets 22, the permanent magnets 22 can be positioned, and contact between adjacent ones of the permanent magnets 22 can be prevented. In addition, in a case where end parts (the third end part 211c and the fourth end part 211d) of the projection 213 which the permanent magnets 22 touch are formed flat or straight, damage to the permanent magnets 22 can be prevented.

However, in a case where the third end part 211c and the fourth end part 211d are formed straight, the magnetic flux from the stator 3 easily passes between the first permanent magnet 22a and the second permanent magnet 22b, that is, easily passes through the projection 213, and the proportion of the magnetic flux flowing into the projection 213 increases. In other words, in the case where the projection 213 extending radially is formed between the first permanent magnet 22a and the second permanent magnet 22b, the magnetic flux from the stator 3 easily passes between the first permanent magnet 22a and the second permanent magnet 22b, that is, easily passes through the projection 213, and the proportion of the magnetic flux flowing into the projection 213 increases. As a result, portions of the permanent magnets 22 adjacent to the projection 213 are easily demagnetized.

In general, a rotor is fabricated by performing press working on electromagnetic steel sheets. Press working causes degradation of magnetic characteristic of the electromagnetic steel sheets, and thus a magnetic flux do not easily pass through the electromagnetic steel sheets. The degradation of the magnetic characteristic caused by the press working affects the entire depth direction of the electromagnetic steel sheet (the z-axis direction).

In the present embodiment, by utilizing the degradation of magnetic characteristic caused by press working, it is possible to reduce the proportion of the magnetic flux from the stator 3 flowing into the projection 213, and to suppress the degradation of demagnetization characteristic of the permanent magnets 22. In particular, as in the present embodiment, since the rotor 2 (specifically, the electromagnetic steel sheets 211) is formed to satisfy the expression of $t \leq 2 \times w \times \sin(R/2) \leq 2 \times t$, the magnetic flux from the stator 3 do not easily passes between the first permanent magnet 22a and the second permanent magnet 22b, that is, do not easily passes through the projection 213. Thus, the degradation of demagnetization characteristic of the permanent magnets 22 can be suppressed.

In addition, by forming the rotor 2 (specifically, the electromagnetic steel sheets 211) to satisfy the conditions of 0.1 mm 1 mm, and t≤2×w×sin(R/2)≤2×t, it is possible to degrade magnetic characteristic of the entire projection 213 and to suppress degradation of the magnetic characteristic of the permanent magnets 22, and in addition, it is possible to obtain the strength enough to perform press working and the strength for positioning the permanent magnets 22.

In general, a magnetic flux from a stator easily passes between adjacent permanent magnets (e.g., a permanent magnet fixing projection for positioning the permanent magnets) and easily flows into the inside of electromagnetic steel sheets in the radial direction. On the other hand, in the present embodiment, since the space 215 is formed inside the magnet insertion holes 212 in the radial direction, the rotor 2 in which the magnetic flux from the stator 3 do not easily pass through the projections 213 can be obtained. By forming the gap 215 at a position adjacent to the projection 213, it becomes further difficult for the magnetic flux from the stator 3 to pass through the projection 213.

In addition, since the space 215 is formed so that the minimum distance (w3 in FIG. 4A) from the space 215 and the magnet insertion hole 212 is t or more and 2×t or less, magnetic characteristic of the entire projection 213 can be degraded, and thereby, degradation of the demagnetization characteristic of the permanent magnets 22 can be suppressed, and in addition, the strength enough to perform press working on the electromagnetic steel sheets 211 can be obtained.

In the present embodiment, in each electromagnetic steel sheet 211, since slits (e.g., the slits 214a and the slits 214b) are formed outside the magnet insertion holes 212 in the radial direction, pulsation of a torque and harmonics of an induced voltage can be reduced. Depending on the positions of slits formed in the electromagnetic steel sheet 211, the magnetic flux from the stator 3 easily passes through the projection 213, and thus the demagnetization characteristic of the permanent magnets 22 can degrade in some cases. For example, in a case where the slits 214a are formed at positions closer to the projection 213 than both end of the magnet insertion hole 212 in the direction orthogonal to the radial direction, the magnetic flux from the stator 3 easily passes through the projection 213. However, as described above, since the rotor 2 (specifically, the electromagnetic steel sheets 211) is formed to satisfy the conditions of 0.1 mm≤t≤1 mm, and t≤2×w×sin(R/2)≤2×t, the strength enough to press working on the electromagnetic steel sheets 211 can be maintained, and magnetic characteristic of the entire projection 213 can be degraded, and thus degradation of the demagnetization characteristic of the permanent magnets 22 can be suppressed.

According to the first variation, advantages similar to those of the first embodiment can be obtained.

According to the second variation, even in a case where angular portions of the permanent magnets 22 (the first permanent magnet 22a and the second permanent magnet 22b in the example illustrated in FIG. 8B) project, the angular portions of the permanent magnets 22 can be released to the clearance grooves 212d. Accordingly, damage to the permanent magnets 22 can be prevented.

In the rotor according to the third variation, since the hollows (e.g., the hollows 414a and 414b) are formed outside the magnet insertion holes 212 in the radial direction in the electromagnetic steel sheet 411, pulsation of a torque and harmonics of an induced voltage can be reduced. Depending on the positions of the hollows formed in the electromagnetic steel sheets 211, the magnetic flux from the stator 3 easily passes through the projection 213, and thus the demagnetization characteristic of the permanent magnets 22 can degrade in some cases. For example, in a case where the hollow 414a is formed at a position closer to the projection 213 than both ends of the magnet insertion hole 212 in the direction orthogonal to the radial direction, the magnetic flux from the stator 3 easily passes through the projection 213. However, as described above, by forming the rotor 2 (specifically, the electromagnetic steel sheets 411) is formed to satisfy the conditions of $$0.1 \leq mm \leq 1 \text{ mm, and } t \leq 2 \times w \times \sin(R/2) \leq 2 \times t,$$

the strength enough to perform press working on the electromagnetic steel sheets 211 can be maintained, and the magnetic characteristic of the entire projection 213 can be degraded, and thus the degradation of the demagnetization characteristic of the permanent magnets 22 can be suppressed.

According to the fourth variation, advantages similar to those of the first embodiment can be obtained.

Figure 12:
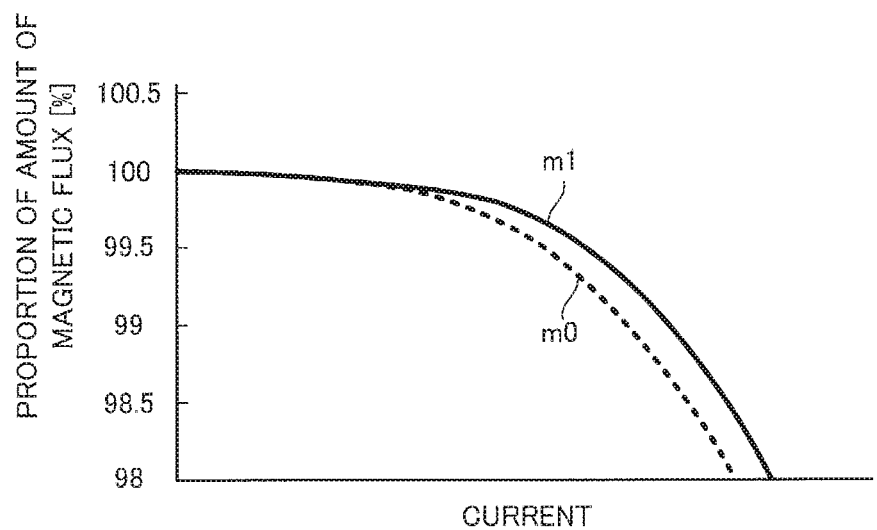
FIG. 12 is a diagram showing relationships between currents running through coils of stators and proportions of the amount of magnetic flux from permanent magnets.

FIG. 12 is a diagram showing relationships between currents running through coils of stators and proportions (%) of the amount of magnetic flux from permanent magnets. In FIG. 12, a relationship between a proportion of an amount of magnetic flux and a current in a conventional electric motor is represented as m0, and a relationship between a proportion of an amount of magnetic flux and a current in the electric motor 1 according to the first embodiment as compared to the conventional electric motor is represented as m1.

As shown in FIG. 12, the proportion of the amount of the magnetic flux from the permanent magnets 22 in the electric motor 1 according to the first embodiment is higher than that in the conventional electric motor, and thus the demagnetization characteristic of the permanent magnets 22 is improved. That is, since the rotor 2 of the electric motor 1 according to the first embodiment (including the variations) satisfies the expression of $$t \leq 2 \times w \times \sin(R/2) \leq 2 \times t,$$

the demagnetization characteristic of the permanent magnets 22 can be improved as compared to a conventional rotor including electromagnetic steel sheets.

As described above, since the electric motor 1 according to the first embodiment includes the rotor 2 described above, a decrease in efficiency of the electric motor 1 can be suppressed so that power of the electric motor can be increased.

With the method for manufacturing the electric motor 1 according to the first embodiment, the electric motor 1 including the rotor 2 satisfying the expression of t≤2×w×sin(R/2)≤2×t (including the variations) can be obtained by performing punching (press working) on the electromagnetic steel sheets 211. As a result, it is possible to fabricate the electric motor 1 in which a decrease in efficiency can be suppressed.

Magnetic characteristic of electromagnetic steel sheets can be restored by annealing the electromagnetic steel sheets, however, in the present embodiment, by not performing annealing of the electromagnetic steel sheets, the magnetic characteristic of the projection 213 can be degraded and the demagnetization characteristic of the permanent magnets 22 can be improved.

In the present embodiment, permanent magnets having small coercive force can be used as the permanent magnets 22. For example, permanent magnets containing no dysprosium or permanent magnets having a small content of dysprosium can be used as the permanent magnets 22. Accordingly, costs of the permanent magnets 22 can be adjusted by adjusting coercive force (i.e., dysprosium content), and thus, costs of the rotor 2 can be reduced.

Examples of the permanent magnet having small coercive force are given as follows: a permanent magnet of a neodymium-iron-boron (Nd—Fe—B)-based rare-earth magnet in which dysprosium content is not greater than 4%, a permanent magnet of a neodymium-iron-boron (Nd—Fe—B)-based rare-earth magnet in which a decrease of coercive force is suppressed by reducing dysprosium or terbium through a diffusion process on dysprosium or terbium, and a permanent magnet of a neodymium-iron-boron (Nd—Fe—B)-based rare-earth magnet containing no dysprosium.

In the present embodiment, without placing limitations on the winding method, the number of slots, and the number of poles in the electric motor 1, the advantages described above can be obtained. Even in a case where permanent magnets having small coercive force are used as the permanent magnets 22 of the electric motor 1, demagnetization resistance substantially equal to that of a conventional electric motor can also be maintained. Accordingly, it is possible to use a reasonable rare-earth magnet to which a small amount of a heavy rare earth element is added. In addition, when the amount of a heavy rare earth element to be added to the permanent magnets 22 is reduced, the density of remaining magnetic flux of the magnets increases. Thus, a magnet torque increases, and a current for generating the same torque can be reduced. As a result, a copper loss and a loss in energizing an inverter can be reduced. Furthermore, even in a case where the thickness (e.g., the thickness in the radial direction) of the permanent magnets 22 is reduced, demagnetization resistance substantially equal to that of a conventional electric motor can be maintained, and the amount of use of an expensive rare-earth metal magnet can be reduced. As a result, costs for the electric motor can be reduced.

Second Embodiment

An air conditioner 10 according to a second embodiment of the present invention will be described.

Figure 13:
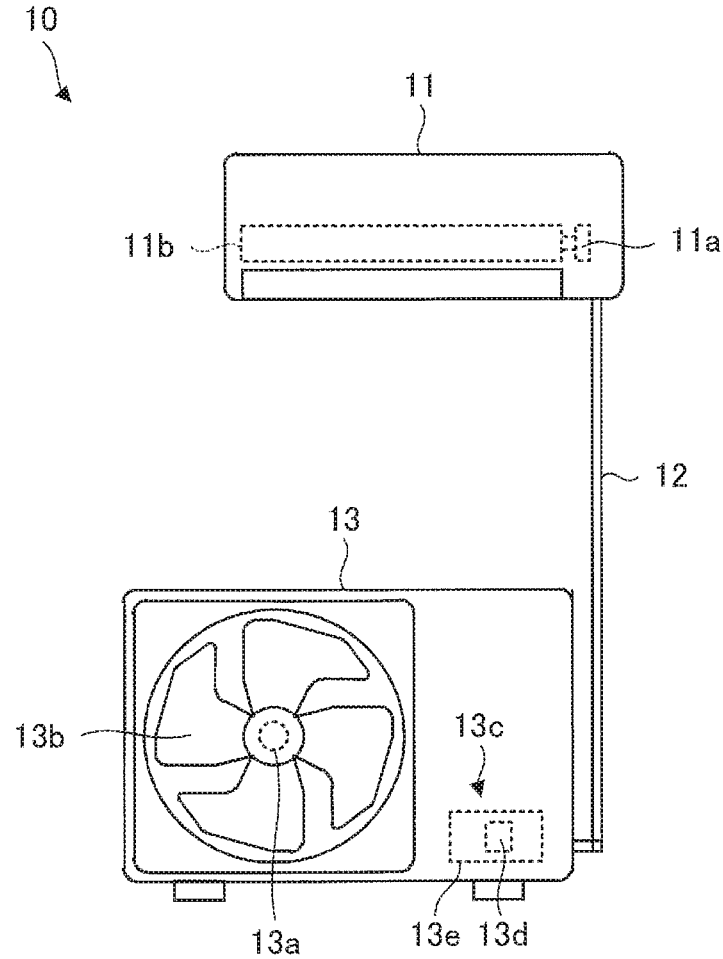
FIG. 13 is a diagram schematically illustrating a configuration of an air conditioner according to a second embodiment of the present invention.

FIG. 13 is a diagram schematically illustrating a configuration of the air conditioner 10 according to the second embodiment of the present invention.

The air conditioner 10 according to the second embodiment includes an indoor unit 11, a refrigerant pipe 12, and an outdoor unit 13 connected to the indoor unit 11 by the refrigerant pipe 12.

The indoor unit 11 includes an electric motor 11a and an air blower 11b (air blower for the indoor unit). The outdoor unit 13 includes an electric motor 13a, a fan 13b as an air blower (air blower for the outdoor unit), a compressor 13c, and a heat exchanger (not shown). The compressor 13c includes an electric motor 13d (e.g., the electric motor 1 according to the first embodiment), a compression mechanism (not shown) that is driven by the electric motor 13d, a housing 13e that holds the electric motor 13d and the compression mechanism.

In the air conditioner 10 according to the second embodiment, at least one of the indoor unit 11 and the outdoor unit 13 includes the electric motor 1 described in the first embodiment (including the variations). Specifically, as a driving source of the air blower, the electric motor 1 described in the first embodiment (including the variations) is applied to at least one of the electric motors 11a and 13a. The compressor 13c may include the electric motor 1 described in the first embodiment (including the variations).

The air conditioner 10 can perform operations such as a cooling operation of sending cold air and a heating operation of sending warm air from the indoor unit 11. In the indoor unit 11, the electric motor 11a is a driving source for driving the air blower 11b. The air blower 11b can send conditioned air. In the outdoor unit 13, the electric motor 13a is a driving source for driving the fan 13b.

In the air conditioner 10 according to the second embodiment, the electric motor 1 described in the first embodiment (including the variations) is applied to at least one of the electric motors 11a and 13a, and thus, advantages similar to those described in the first embodiment can be obtained.

In addition, according to the second embodiment, the compressor 13c and the air conditioner 10 having high operating efficiency and low noise can be provided.

The electric motor 1 described in the first embodiment (including the variations) can be mounted on equipment including a driving source, such as a ventilating fan, a home appliance, or a machine tool, in addition to the air conditioner 10.

The features of the embodiments and the features of the variations described above can be combined as appropriate.

What is claimed is:

1. A rotor comprising:
a first permanent magnet;
a second permanent magnet; and
an electromagnetic steel sheet including a magnet insertion hole and a projection formed between the first permanent magnet and the second permanent magnet, the first permanent magnet and the second permanent magnet being disposed in the magnet insertion hole,
wherein the electromagnetic steel sheet includes:
a first end part defining the magnet insertion hole;
a second end part defining the magnet insertion hole;
a third end part forming the projection and formed straight in a plane perpendicular to an axial direction; and
a fourth end part forming the projection and formed straight in the plane perpendicular to the axial direction, and
wherein the rotor satisfies an expression of
$t \le 2 \times w \times \sin(R/2) \le 2 \times t$, where t is a thickness of the electromagnetic steel sheet, R is an angle formed by the third end part and the fourth end part, and w is a distance from an intersection point of a straight line including the first end part and a straight line including the third end part to an intersection point of a straight line including the third end part and a straight line including the fourth end part.

2. The rotor according to claim 1,
wherein the third end part is an edge forming an end part of the projection in a direction orthogonal to a radial direction of the rotor.

3. The rotor according to claim 1,
wherein the fourth end part is an edge forming an end part of the projection in a direction orthogonal to a radial direction of the rotor.

4. The rotor according to claim 1,
wherein the projection projects outward in a radial direction of the rotor.

5. The rotor according to claim 1,
wherein the electromagnetic steel sheet includes a slit formed outside the magnet insertion hole in a radial direction of the rotor.

6. The rotor according to claim 5,
wherein the slit is elongated in the radial direction of the rotor.

7. The rotor according to claim 5,
wherein the slit is formed at a position closer to the projection than both ends of the magnet insertion hole in the direction orthogonal to the radial direction of the rotor.

8. The rotor according to claim 1,
wherein the electromagnetic steel sheet includes a hollow formed outside the magnet insertion hole in a radial direction of the rotor.

9. The rotor according to claim 8,
wherein the hollow is elongated in the radial direction of the rotor.

10. The rotor according to claim 8,
wherein the hollow is formed at a position closer to the projection than both ends of the magnet insertion hole in a direction orthogonal to the radial direction of the rotor.

11. The rotor according to claim 1,
wherein the electromagnetic steel sheet ranges in thickness from 0.1 mm to 1 mm.

12. The rotor according to claim 1,
wherein the electromagnetic steel sheet further includes a space formed inside the magnet insertion hole in a radial direction of the rotor, and
wherein a minimum distance from the space to the magnet insertion hole is t or more and $2 \times t$ or less, where t is a thickness of the electromagnetic steel sheet.

13. The rotor according to claim 1,
wherein the first end part faces the first permanent magnet, the second end part faces the second permanent magnet, the third end part faces the first permanent magnet, and the fourth end part faces the second permanent magnet.

14. An electric motor comprising:
a stator; and
a rotor,
wherein the rotor includes:
   a first permanent magnet;
   a second permanent magnet; and
   an electromagnetic steel sheet including a magnet insertion hole and a projection formed between the first permanent magnet and the second permanent magnet, the first permanent magnet and the second permanent magnet being disposed in the magnet insertion hole,
wherein the electromagnetic steel sheet includes:
   a first end part defining the magnet insertion hole;
   a second end part defining the magnet insertion hole;
   a third end part forming the projection and formed straight in a plane perpendicular to an axial direction; and
   a fourth end part forming the projection and formed straight in the plane perpendicular to the axial direction, and
wherein the rotor satisfies an expression of
$t \leq 2 \times w \times \sin(R/2) \leq 2 \times t$, where t is a thickness of the electromagnetic steel sheet, R is an angle formed by the third end part and the fourth end part, and w is a distance from an intersection point of a straight line including the first end part and a straight line including the third end part to an intersection point of a straight line including the third end part and a straight line including the fourth end part.

15. A compressor comprising:
an electric motor;
a compression mechanism that is driven by the electric motor; and
a housing holding the electric motor and the compression mechanism, wherein the electric motor includes:
   a stator; and
   a rotor,
wherein the rotor includes:
   a first permanent magnet;
   a second permanent magnet; and
   an electromagnetic steel sheet including a magnet insertion hole and a projection formed between the first permanent magnet and the second permanent magnet, the first permanent magnet and the second permanent magnet being disposed in the magnet insertion hole,
wherein the electromagnetic steel sheet includes:
   a first end part defining the magnet insertion hole;
   a second end part defining the magnet insertion hole;
   a third end part forming the projection and formed straight in a plane perpendicular to an axial direction; and
   a fourth end part forming the projection and formed straight in the plane perpendicular to the axial direction, and
wherein the rotor satisfies an expression of
$t \leq 2 \times w \times \sin(R/2) \leq 2 \times t$, where t is a thickness of the electromagnetic steel sheet, R is an angle formed by the third end part and the fourth end part, and w is a distance from an intersection point of a straight line including the first end part and a straight line including the third end part to an intersection point of a straight line including the third end part and a straight line including the fourth end part.

16. An air conditioner comprising:
an indoor unit; and
an outdoor unit connected to the indoor unit,
wherein at least one of the indoor unit and the outdoor unit includes an electric motor,
wherein the electric motor includes:
   a stator; and
   a rotor,
wherein the rotor includes:
   a first permanent magnet;
   a second permanent magnet; and
   an electromagnetic steel sheet including a magnet insertion hole and a projection formed between the first permanent magnet and the second permanent magnet, the first permanent magnet and the second permanent magnet being disposed in the magnet insertion hole,
wherein the electromagnetic steel sheet includes:
   a first end part defining the magnet insertion hole;
   a second end part defining the magnet insertion hole;
   a third end part forming the projection and formed straight in a plane perpendicular to an axial direction; and
   a fourth end part forming the projection and formed straight in the plane perpendicular to the axial direction, and
wherein the rotor satisfies an expression of
$t \leq 2 \times w \times \sin(R/2) \leq 2 \times t$, where t is a thickness of the electromagnetic steel sheet, R is an angle formed by the third end part and the fourth end part, and w is a distance from an intersection point of a straight line including the first end part and a straight line including the third end part to an intersection point of a straight line including the third end part and a straight line including the fourth end part.

17. A method for manufacturing an electric motor including a first permanent magnet, a second permanent magnet, and an electromagnetic steel sheet, the electromagnetic steel sheet including:
- a magnet insertion hole;
- a projection formed between the first permanent magnet and the second permanent magnet;
- a first end part defining the magnet insertion hole;
- a second end part defining the magnet insertion hole;
- a third end part forming the projection; and
- a fourth end part forming the projection, the method comprising the steps of:
  - forming the magnet insertion hole to satisfy an expression of
    - $t \leq 2 \times w \times \sin(R/2) \leq 2 \times t$, where t is a thickness of the electromagnetic steel sheet, R is an angle formed by the third end part and the fourth end part, and w is a distance from an intersection point of a straight line including the first end part and a straight line including the third end part to an intersection point of a straight line including the third end part and a straight line including the fourth end part; and
  - inserting the first permanent magnet and the second permanent magnet into the magnet insertion hole,
  - wherein the third end part is formed straight in a plane perpendicular to an axial direction, and
  - wherein the fourth end part is formed straight in the plane perpendicular to the axial direction.

* * * * *